(12) United States Patent
Samuel

(10) Patent No.: US 8,793,330 B2
(45) Date of Patent: Jul. 29, 2014

(54) INFORMATION DISPLAY SYSTEM AND METHOD

(76) Inventor: Lit Samuel, Penn Valley, PA (US)

( * ) Notice: Subject to any disclaimer, the term of this patent is extended or adjusted under 35 U.S.C. 154(b) by 0 days.

(21) Appl. No.: 12/291,339

(22) Filed: Nov. 7, 2008

(65) Prior Publication Data

US 2009/0172090 A1 Jul. 2, 2009

Related U.S. Application Data

(60) Provisional application No. 61/002,398, filed on Nov. 7, 2007, provisional application No. 61/002,502, filed on Nov. 9, 2207.

(51) Int. Cl.
*G06F 15/16* (2006.01)
*G06F 17/30* (2006.01)
*G06F 3/0481* (2013.01)

(52) U.S. Cl.
CPC *G06F 17/30058* (2013.01); *G06F 2203/04802* (2013.01); *G06F 3/0481* (2013.01)
USPC ........... 709/217; 715/231; 715/240; 715/825; 715/861

(58) Field of Classification Search
CPC ............ H04N 21/858; H04N 21/4782; H04N 21/812; H04N 21/23617; H04N 21/25891; H04N 21/8586
USPC ................... 709/217; 715/231, 240, 825, 861
See application file for complete search history.

(56) References Cited

U.S. PATENT DOCUMENTS

| | | | |
|---|---|---|---|
| 6,267,675 B1 * | 7/2001 | Lee | 463/40 |
| 6,442,529 B1 * | 8/2002 | Krishan et al. | 705/14.52 |
| 2002/0184089 A1 * | 12/2002 | Tsou et al. | 705/14 |
| 2003/0110225 A1 * | 6/2003 | Billadeau | 709/206 |
| 2006/0253794 A1 * | 11/2006 | Wilson | 715/779 |
| 2007/0244756 A1 * | 10/2007 | Stucki | 705/14 |

* cited by examiner

*Primary Examiner* — Mohamed Ibrahim
(74) *Attorney, Agent, or Firm* — Dilworth Paxson LLP

(57) ABSTRACT

The invention disclosed herein is directed to a system and method for displaying graphics, text, animation, video and other content. In one embodiment of the invention, the system comprises a three-dimensional "Display Carousel" system. The system may include one or more display windows, each of which is capable of displaying different content. The configuration of the windows may give the appearance of rotating like a carousel and also of the carousel and/or images being three-dimensional. Other features of the invention may include functionality which permits the uploading and downloading of content, statistical data gathering, and revenue generation.

20 Claims, 11 Drawing Sheets accountspaid

| Field | Type | Null | Default | Comments |
|---|---|---|---|---|
| id | int(9) | No | | |
| type | enum('media', 'display', 'other') | No | | |
| user_id | int(10) | No | | |
| user_name | varchar(127) | No | | |
| ref_id | int(9) | No | | |
| value | decimal(7,2) | No | | |
| invoice | varchar(127) | No | | |
| ccname | varchar(127) | No | | |
| paid | smallint(3) | No | 0 | |
| due | date | Yes | *NULL* | |
| timestamp | timestamp | No | CURRENT_TIMESTAMP | |

FIG. 2 adminusers

| Field | Type | Null | Default | Comments |
|---|---|---|---|---|
| id | int(9) | No | | |
| username | varchar(31) | No | | |
| password | varchar(31) | No | | |
| displayname | varchar(127) | No | | |
| email | varchar(127) | No | | |
| company | varchar(127) | No | | |
| timestamp | timestamp | No | CURRENT_TIMESTAMP | |

FIG. 3 bannerstats

| Field | Type | Null | Default | Comments |
|---|---|---|---|---|
| banner_id | int(9) | Yes | *NULL* | |
| rec_type | enum('click', 'view') | No | | |
| user_ip | varchar(20) | No | | |
| timestamp | timestamp | No | CURRENT_TIMESTAMP | |

FIG. 4 displaystats

| Field | Type | Null | Default | Comments |
|---|---|---|---|---|
| display_id | int(9) | Yes | *NULL* | |
| user_ip | varchar(20) | No | | |
| user_agent | varchar(127) | No | | |
| referer | varchar(255) | No | | |
| query | varchar(63) | No | | |
| timestamp | timestamp | No | CURRENT_TIMESTAMP | |

FIG. 5 displaystats_focus

| Field | Type | Null | Default | Comments |
|---|---|---|---|---|
| session_id | varchar(127) | No | | |
| display_id | varchar(63) | No | | |
| url_link | varchar(255) | No | | |
| counter | int(11) | No | | |
| uid | int(9) | No | | |
| rid | int(9) | No | | |
| time_start | timestamp | No | CURRENT_TIMESTAMP | |
| time_end | timestamp | No | 0000-00-00 00:00:00 | |

FIG. 6 displaystats_hits

| Field | Type | Null | Default | Comments |
|---|---|---|---|---|
| id | int(10) | No | | |
| display_id | int(9) | No | | |
| views | int(9) | No | | |
| clicks | int(9) | No | | |
| date | date | No | | |
| timestamp | timestamp | No | CURRENT_TIMESTAMP | |

FIG. 7 displayusers

| Field | Type | Null | Default | Comments |
|---|---|---|---|---|
| id | int(9) | No | | |
| network | int(9) | No | | |
| fbmlid | varchar(127) | No | | |
| username | varchar(127) | No | | |
| password | varchar(31) | No | | |
| displayname | varchar(127) | No | | |
| email | varchar(127) | No | | |
| website | varchar(255) | No | | |
| firstname | varchar(63) | No | | |
| lastname | varchar(63) | No | | |
| company | varchar(63) | No | | |
| telephone | varchar(63) | No | | |
| street1 | varchar(63) | No | | |
| street2 | varchar(63) | No | | |
| city | varchar(63) | No | | |
| state | varchar(63) | No | | |
| zipcode | varchar(63) | No | | |
| secquestion | varchar(255) | No | | |
| secanswer | varchar(255) | No | | |
| birthmonth | tinyint(2) | No | | |
| birthday | tinyint(2) | No | | |
| birthyear | int(5) | No | | |
| ccname | varchar(63) | No | | |
| ccdigi | varchar(63) | No | | |
| discount | varchar(127) | No | | |
| invoice | varchar(31) | No | | |
| timestamp | timestamp | No | CURRENT_TIMESTAMP | |
| lastlogin | timestamp | No | 0000-00-00 00:00:00 | |
| maxuploads | tinyint(3) | No | 30 | |
| hreflinks | tinyint(1) | No | 0 | |
| hrefurl | varchar(255) | No | | |
| price | decimal(6,2) | No | 25.00 | |
| verified | tinyint(3) | No | 0 | |
| active | tinyint(3) | No | 0 | |

FIG. 8 mediauploads

| Field | Type | Null | Default | Comments |
|---|---|---|---|---|
| id | bigint(10) | No | | |
| user | varchar(255) | No | | |
| file | varchar(255) | No | | |
| url | varchar(255) | No | | |
| active | smallint(3) | No | 1 | |
| remote | int(9) | Yes | NULL | |
| statview | int(10) | No | 0 | |
| statclick | int(10) | No | 0 | |
| timestamp | timestamp | No | CURRENT_TIMESTAMP | |

FIG. 9 mediausers

| Field | Type | Null | Default | Comments |
|---|---|---|---|---|
| id | int(10) | No | | |
| network | int(9) | Yes | NULL | |
| email | varchar(127) | No | | |
| username | varchar(63) | No | | |
| password | varchar(63) | No | | |
| firstname | varchar(63) | No | | |
| lastname | varchar(63) | No | | |
| company | varchar(63) | No | | |
| telephone | varchar(63) | No | | |
| street1 | varchar(63) | No | | |
| street2 | varchar(63) | No | | |
| city | varchar(63) | No | | |
| state | varchar(63) | No | | |
| zipcode | varchar(63) | No | | |
| secquestion | varchar(255) | No | | |
| secanswer | varchar(255) | No | | |
| birthmonth | tinyint(2) | No | | |
| birthday | tinyint(2) | No | | |
| birthyear | int(5) | No | | |
| ccname | varchar(63) | No | | |
| ccdigi | varchar(63) | No | | |
| orders | varchar(63) | No | | |
| discount | varchar(31) | No | | |
| invoice | varchar(31) | No | | |
| timestamp | timestamp | No | CURRENT_TIMESTAMP | |
| maxuploads | tinyint(3) | No | 1 | |
| admin | tinyint(2) | No | 0 | |
| active | tinyint(3) | No | 1 | |

FIG. 10 newsletter

| Field | Type | Null | Default | Comments |
|---|---|---|---|---|
| id | bigint(20) | No | | |
| name | varchar(255) | No | | |
| zip | varchar(255) | No | | |
| email | varchar(255) | No | | |
| flag | tinyint(1) | No | | |

[ Print ]

FIG. 11

INFORMATION DISPLAY SYSTEM AND METHOD

CROSS REFERENCE TO RELATED APPLICATIONS

This application claims priority to U.S. Provisional Patent Application Ser. No. 61/002,398, filed Nov. 7, 2007, and U.S. Provisional Patent Application Ser. No. 61/002,502, filed Nov. 9, 2007, the entireties of which are incorporated herein by reference.

FIELD OF INVENTION

This invention is directed to a media application system and method. More particularly, the invention relates to a digital media application platform and method which dynamically delivers and displays content via computerized systems and internet websites in real time.

BACKGROUND OF THE INVENTION

With the advent of the computer age, and particularly the internet, the dissemination of information and particularly advertising has vastly improved over more traditional means such as, for example, via print media, television, and radio. However, even with the significant improvements in computing and the internet over the past decade, the systems, methods and applications available for disseminating and presenting information in a rapid and efficient way to users of computerized or internet based systems are limited.

For example, advertising on the internet has been relegated to a few common methods such as, for example, relatively static banner advertisements and so-called "framing" of advertisements wherein static advertisements appear in a frame around a website's active window.

Accordingly, there exists a need for an improved system and method for disseminating information, and particularly advertising, over the internet in a rapid yet cost effective manner. There is a further need for such improved systems which utilize minimal computing capacity or while maximizing the available space for content which is visible to the user of an internet website or other computing display window.

SUMMARY OF THE INVENTION

The instant invention comprises an apparatus and method for displaying content on a computerized system. In one embodiment, the apparatus comprises a display carousel system server, and a client portal in communication with the server.

In another embodiment, the invention comprises a method for displaying content on a computerized system. This method comprises the steps of generating a display carousel which resides on a client portal and/or at least one third party portal. In this embodiment, the display carousel may also comprise one or more display windows. The method may further comprise the step of generating a display carousel which resides on a client portal and at least one third party portal. In addition, the method may further comprise the step of providing content on one or more display windows of the display carousel. As will be described in further detail herein, there are many additional features of the instant invention.

BRIEF DESCRIPTION OF THE DRAWINGS

Understanding of the present invention will be facilitated by consideration of the following detailed description of the embodiments of the present invention taken in conjunction with the accompanying drawing, in which like numerals refer to like parts, and wherein:

FIG. 2 depicts an embodiment of a database datafile list of the system of FIG. 1.

FIG. 3 depicts an embodiment of a database datafile list of the system of FIG. 1.

FIG. 4 depicts an embodiment of a database datafile list of the system of FIG. 1.

FIG. 5 depicts an embodiment of a database datafile list of the system of FIG. 1.

FIG. 6 depicts an embodiment of a database datafile list of the system of FIG. 1.

FIG. 7 depicts an embodiment of a database datafile list of the system of FIG. 1.

FIG. 8 depicts an embodiment of a database datafile list of the system of FIG. 1.

FIG. 9 depicts an embodiment of a database datafile list of the system of FIG. 1.

FIG. 10 depicts an embodiment of a database datafile list of the system of FIG. 1.

FIG. 11 depicts an embodiment of a database datafile list of the system of FIG. 1.

DETAILED DESCRIPTION

Figure 1:
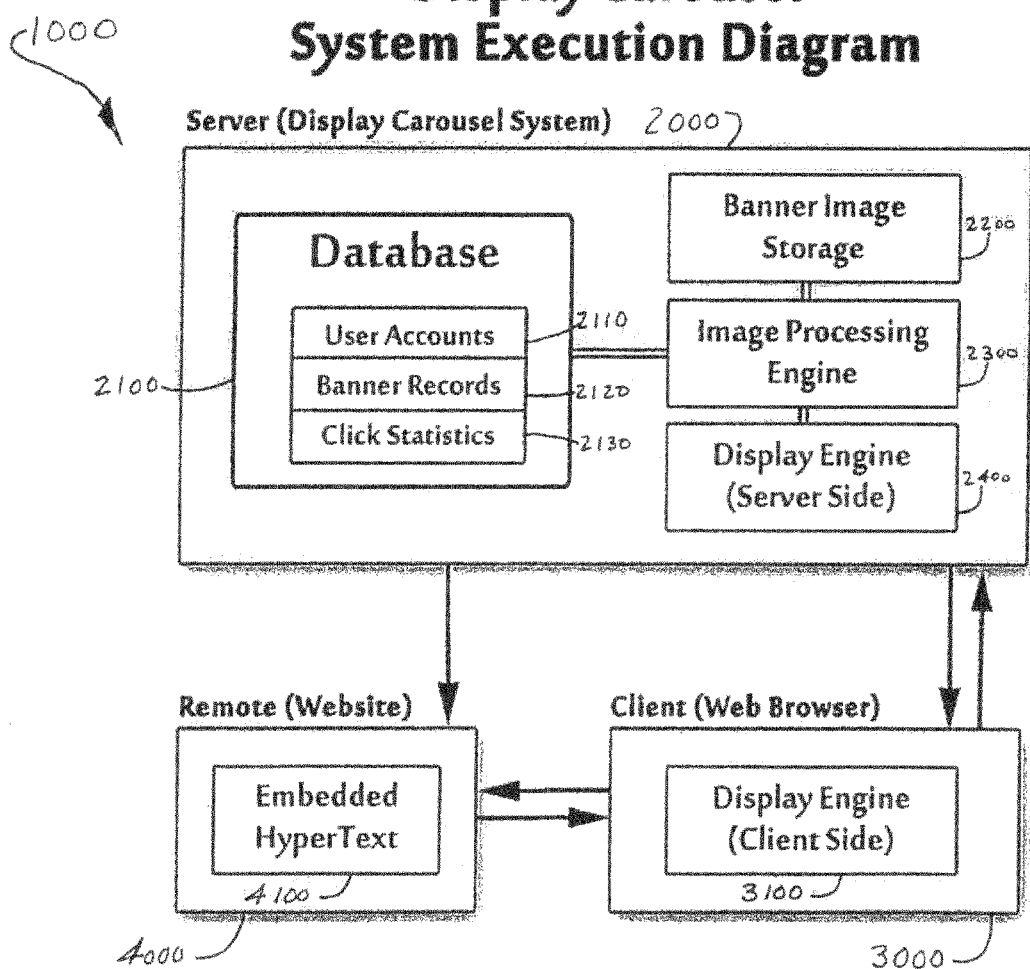
FIG. 1 depicts a flow diagram of an embodiment of the system of the present invention.

It is to be understood that the figures and descriptions of the present invention have been simplified to illustrate elements that are relevant for a clear understanding of the present invention, while eliminating, for the purposes of clarity, many other elements which may be found in the present invention. Those of ordinary skill in the pertinent art will recognize that other elements are desirable and/or required in order to implement the present invention. However, because such elements do not facilitate a better understanding of the present invention, a discussion of such elements is not provided herein.

In one embodiment of the invention, the media platform application comprises a "Display Carousel" system which dynamically displays and disseminates various types of information and provides certain functionality in displaying and disseminating information. The Display Carousel comprises one or more display windows each of which are capable of displaying text, graphics, animation, video and/or other content. In embodiments where there is more than one display window, the Display Carousel may give the appearance of a rotating "carousel" of display windows wherein each window contains its own individual content. In yet another embodiment, the display windows and/or content may be arranged so as to make the display windows and/or content have the appearance of being three-dimensional.

A dynamic example of a Display Carousel may be seen at www.yourdisplaycarousel.com. www.yourdisplaycarousel.com is incorporated herein, in its entirety, by reference. In this embodiment, multiple display windows containing select content, such as photographs, audio, video, text, and hyperlinks appear to rotate from right to left giving the appearance of a rotating carousel of windows. The carousel may be configured to pause for a specified period of time to permit each window to be viewed. Alternatively, the Display Carousel may continuously rotate the windows at a desired rate of speed.

The Display Carousel is not limited to still-frame data. The Display Carousel may incorporate, deliver and/or display any type of data including but not limited to audio, video, animated, and other data. For example, the following links demonstrate the versatility of the sub navigational component applications that may be incorporated into the Display Carousel, or can be delivered separately from the Display Carousel:

http://www.hylitradio.com/demos/coupon
http://www.hylitradio.com/demos/video
http://hylitradio.com/productlogo/demo/most_on_the_planet_hylitradio.com.way Each of the foregoing links are incorporated herein, in its entirety, by reference.

A user of the Display Carousel may download the Display Carousel application directly to a website or webpage. See www.yourdisplaycarousel.com. The user may then upload content, such as for example, photographs, graphics, text, animation, website links, banners and the like, to the Display Carousel application resident on the user's website. Likewise, the user may permit third parties to upload their own content to one or more of the windows of the Display Carousel. Content may be uploaded into the windows of the Display Carousel through links on the website or through a private Display Carousel system.

The system and method of this invention may also optionally be enabled to automatically charge a third party a fee for the use of one or more windows of the user's Display Carousel.

The system and method of this invention may also optionally be enabled to automatically limit the amount of time that particular content appears on each window. Content may either alternate with other content in its appearance in a particular window or alternate between windows. A third party may be charged a fee for the time content is displayed on a window or multiple windows. The content may also be automatically removed from a window after a specified amount of time.

The system of the instant invention may be based upon any suitable operating system however, a Linux based operating system is preferred. In addition, the system of this invention may include one or more of the following modules: (i) upload gateways for uploading content to the system; (ii) automatic revenue modules for tracking and administering the revenue model utilized in the user's system; and (iii) payment processing modules for processing payments by credit card or by other means.

In one embodiment of the invention, an advertiser interested in advertising on a user's website may go to the user's website which contains a custom Display Carousel. The website may contain hyperlinks which enable the advertiser to purchase windows on the Display Carousel. The advertiser may click on the hyperlink, log onto the Display Carousel system, set up an account, purchase a position and time for the advertiser's content to be displayed in a window or windows of the Display Carousel, submit payment information, and upload the advertiser's content to the window or windows. Advertisers may also embed hyperlinks into their displays for users to click through to the advertiser's website or other location.

In yet another embodiment, payment processing modules may be configured for automatic billing. Amounts charged to advertisers for use of the Display Carousel may be set by a Display Carousel administrator. Advertisers may open an account and continually access the Display Carousel for advertising on the Display Carousel. The payment processing module stores the advertiser's payment information, such as a credit card, for transaction and data processing. Advertisers' access to the Display Carousel may be automatically renewed or, optionally, an e-mail or other form of communication may be generated by the system of the invention to give the advertiser the option to opt out of or discontinue usage prior to renewal or other point in time. Revenue may be generated by the Display Carousel system based upon advertising activity or other metric specified by the Display Carousel administrator.

In yet another embodiment of the invention, an administrative menu option may permit the setting of the parameters of pricing to be charged to advertisers for use of the Display Carousel. The revenue generated by advertising on the Display Carousel may be split between the Display Carousel host who administers the Display Carousel, and/or one or more third parties.

Attached hereto as Exhibit A is a description of yet another embodiment of the invention. At A-3 of Exhibit A, there is depicted a mechanism for downloading Display Carousel application software to integrate into a website. The Display Carousel application code, together with activation instructions may be delivered after the entry of an e-mail address. One embodiment of the application downloading function is attached hereto as Exhibit B. In this embodiment, the downloaded Display Carousel code and activation instructions are depicted at B-3 of Exhibit B. Once the code is downloaded, it may be copied and pasted into a website. An e-mail is then sent to the e-mail address used to commence the downloading process. The e-mail may contain additional activation instructions to enable customization of the Display Carousel.

Turning now to FIG. 1, there is shown a flow diagram of an embodiment of the Display Carousel System 1000 of the present invention. System 1000 comprises a server 2000, and client web browser 3000. Server 2000 comprises database 2100 in communication with banner image storage 2200, where images may be stored, image processing engine 2300, where images may be processed, and server side display engine 2400 which may receive and deliver images to client web browser 3000. Database 2100 may comprise data storage and retrieval functionality including user accounts 2110, banner records 2120, and click statistics 2130. In addition, server 2000 may deliver Display Carousel System 1000 platform applications wherever they may be directed, such as, for example, on websites, in e-mails, attached to pictures, affixed to media players, etc. System 1000 may be supported by any suitable operating system, but preferably is based upon a Linux operating system.

Client web browser 3000 may comprise client side display engine 3100 which may pass the image to be displayed to remote website 4000. Remote website 4000 comprises embedded hypertext 4100 which may permit viewing of the image displayed on the Display Carousel which appears at remote website 4000.

System 1000 permits the cross pollination of data between, and allows for seamless navigation across, all system 1000 platforms including server 2000, client web browsers 3000, remote websites 4000 and websites all destination platforms. Data from server 2000, including images, text, video, and other content, as well as account, record and other statistical and financial information, may be passed to client web browser 3000; and then passed from client web browser 3000 to remote website 4000. Data may also be passed from remote website 4000 to client web browser 3000; and then from client web browser 3000 to server 2000. In addition, in some configurations, certain data may also be passed directly from server 2000 to remote website 4000.

The following website URL's are exemplars of Remote Websites 4000 of FIG. 1 in which a display carousel and/or other images, text, video, and/or other content, as well as account, record and other statistical and financial information may be downloaded from one or more of server 2000, client web browser 3000, and/or remote website 4000. Each of the following websites are incorporated herein by reference.

www.HyLitRadio.com
www.HyLitRhythm.com
www.hylitcountry.com
www.hylitsgentlewave.com
www.Philadelphiaoldies.com
www.Phillysoldies.com
www.Phillysoldies.net
www.Phildelphiasoldies.com
www.Philadelphiasoldies.net
www.k-jewel.com
www.HyLitMediaCapture.com
www.HyLitGlobalSearch.com
www.hylitsearch.com
www.YourDisplayCarousel.com
www.mydisplaycarousel.com
www.hylitspotlight.com
www.hylitdisplaycarousel.com
www.hylitradiotechnologies.com
www.hylitradiotechnologiesinc.com
www.ceme2.com
www.displaycarousel.com
www.highlitglobalsearch.com
www.highlitradio.com
www.oiceu.com
www.seme2.com Of the foregoing URL's, those which are not underlined are parked. Moreover, dedicated advertiser account access may also be accessed through remote website destinations 4000.

The system of this invention www.YourDisplayCarousel.com is a series of sophisticated software engines. The unique organic nature of these engines are specifically designed to cross pollinate data, information processing, instructions, execution, and delivery of a multitude of features and multimedia simultaneously and seamlessly, from the client side to the user side to the destination location of the requested systematic function, instantly. The administrative and other functions of these databases are described below.

Turning now to FIGS. 2 through 11 there is shown an embodiment of various datafiles and data base dictionary management lists which may be present in the System 1000 of FIG. 1. Because of the modularity and flexibility of the system of the present invention, it is understood that many other functions and associated data may be incorporated into and utilized with the system. Generally, each of the datafiles may represent and support the administration application functions which are present in the system database. The datafiles are the engines that tie users to their accounts, host locations while providing executive display access and delivery oversight and control. Each of the datafiles utilized in the embodiment depicted in FIG. 2 are described below.

FIG. 2 depicts the "accountspaid" datafile. The "accountspaid" datafile is a commerce gateway application engine. This datafile encompasses user administration, purchaser administration, data and credit card processing, find transfers, notification, re-notification, renewal and host update notification/confirmation.

FIG. 3 depicts the "adminusers" datafile. The "adminusers" datafile is an access portal engine and datafile for account access to Executive and other functionality. The Executive function provides administration and oversight of all system user accounts, activities, revenues and transfers, statistical values, real time monitoring of networks, all network activity, global/geographic delivery options, and sub navigation control of all functions. Other functionality also includes local account administration navigation for all Subscribers, Advertisers, active and host account system administration.

FIG. 4 depicts the "bannerstats" datafile. The "bannerstats" datafile is a statistical data gathering engine and datafile for all banners/picture information audio and video delivery systems for real time and historical access and display across all applicable accounts.

FIG. 5 depicts the "displaystats" datafile. The "displaystats" datafile is a display function administration engine and datafile for all applicable user and executive accounts.

FIG. 6 depicts the "displaystats_focus" datafile. The "displaystats_focus" datafile is a statistical data gathering engine and datafile of all Display Carousels, when they are present, for composite and individual real time and historical time stamp.

FIG. 7 depicts the "displaystats_hits" datafile. The "displaystats_hits" datafile is a statistical data gatherer engine and datafile of all activity generated by URL linked navigation associated with any and all individual banners, pictures, audio or video delivery or sub navigation activity.

FIG. 8 depicts the "displayusers" datafile. The "displayusers" datafile is a sign up and activation engine and datafile for all users, subscribers, hosts, etc. and the seating engine applicable to that account administration participation.

FIG. 9 depicts the "mediauploads" datafile. The "mediauploads" datafile is an upload function engine and datafile in all accounts to the storage engines for on demand delivery where applicable and selected by any subscriber, host, users or platform administrator.

FIG. 10 depicts the "mediausers" datafile. The "mediausers" datafile is a sign up and activation engine and datafile for all advertisers, and a seating engine applicable to that account administration participation.

FIG. 11 depicts the "newsletter" datafile. The "newsletter" datafile is a newsletter signup administration engine and datafile.

Turning now to Exhibits C through H, there is shown an embodiment of the system and steps for creating a customized Display Carousel of the instant invention. First, a user account is established. A username and password are assigned to the user of the user account. The user then goes to the Display Carousel website, in this case www.yourdisplaycarousel.com as shown in Exhibit C, and clicks on "or login to your current account here." See Exhibit C.

The user then is presented with a Personal Display Carousel Login screen. See Exhibit D. The user enters the user's user account username and password, and clicks on "Log In." See Exhibit D.

The user is then presented with the user's "Your Display Carousel" Home Page. See Exhibit E. The Home Page may include, for example, a dynamic image of the user's personal rotating Display Carousel which shows the Display Carousel and images and other content which is currently loaded on the Display Carousel.

The Home Page may also include a menu of options for creating and/or editing the Display Carousel, obtaining, tracking or otherwise manipulating statistical data associated with the Display Carousel, and/or other options. In the embodiment of Exhibit E, the Home Page Comprises a menu which permits access to the "Home Page", "Upload Banners" editing function, "Get-It-Now Code" function for obtaining the setup code for placing the Display carousel on one or more web pages, and "Log Out" function, for logging out of the user's Your Display Carousel Home Page.

Clicking on the "Home" button on the Home Page of the "Your Display Carousel" Home Page of Exhibit E will bring the user to the "Your Display Carousel" Home Page of Exhibit E.

Clicking on the "Get-It-Now Code" button of the "Your Display Carousel" Home Page of Exhibit E will bring the user to the code and instructions for setting up a Display Carousel. See Exhibit F. Once the Display Carousel is set up, the Display Carousel may be edited by the user.

Once at the "Get-It-Now Code" Page, the user may copy the setup code presented and insert the code into a website or webpage. Once the code is copied into the website of webpage, the website or webpage may be saved and uploaded to a web hosting account. The Display Carousel will then be displayed on the website or webpage.

Also present in the "Get-It-Now Code" Page may be Advertising Code. The Advertising Code may comprise link code which may be copied onto the user's website or webpage which contains the Display Carousel. The Advertising Code may provide a hyperlink to enable advertisers to purchase advertising in a window or windows of the user's Display Carousel present on the user's website or webpage.

Also on the "Get-It-Now Code" Page, the user may optionally set the price that the user wishes to charge advertisers for advertising on the user's Display Carousel. Thus, when an advertiser visits one of the user's websites or web pages displaying the Display Carousel, the advertiser may purchase advertising space in a window or windows of the user's Display Carousel. The advertiser may also be able to upload the advertiser's advertisement or other content onto the user's Display Carousel.

Clicking on the "Upload Banners" button on the Home Page of Exhibit E will bring the user to the "Content Upload" Page of Exhibit G. A dynamic rotating image of the user's Display Carousel appears at the top of the Content Upload Page. File names of the images, advertising or other content to be uploaded onto the windows of the user's Display Carousel may be entered into the "Upload File" field of Exhibit G. The Content Upload Page may also be configured to accept files or other data of any type. In the embodiment of Exhibit G, the file types which may be accepted by the system are .jpg, .gif, and .png.

The file name of the content to be uploaded, as well as the website or webpage (e.g. Banner Page Link or other URL), may be entered in the appropriate fields of the Content Upload Page. The "Activate" box on the Content Upload Page associated with the content to be uploaded may then be checked. The file (such as for example an image file) may then be uploaded to a window of the Display Carousel located at a designated website or webpage. This process may be repeated until the desired number of files or other content is loaded onto the windows of the Display Carousel. The files may also be removed from the Display carousel by clicking on the "Remove" button associated with the file to be removed. Clicking on the "Update" button will update the content displayed on the Display Carousel in accordance with the settings then activated on the Content Upload Page.

Clicking on the "Log Out" button of the "Your Display Carousel" Home Page of Exhibit E will log the user out of the user's account of the Display Carousel System.

Exhibit H depicts the user's personalized Display Carousel as it appears on the user's website or webpage in accordance with the settings set on the Content Upload Page.

Turning now to Exhibits I through S, there is shown another embodiment of the system and steps for creating a customized Display Carousel, as well as other features of the instant invention. The user first goes to the Display Carousel website, in this case www.yourdisplaycarousel.com as shown in Exhibit I and clicks on "Create your own Display Carousel." See Exhibit I. A user account is established and username and password are assigned to the user of the user account. Registered users may sign in to the system at the same screen. See Exhibit I.

The user then is presented with a Home Page screen. See Exhibit J. The Home Page screen comprises the following links or buttons: "Home" which directs the user to the Home page; "Upload Pictures" to the Display Carousel. See Exhibit J and K; "Setup Code to access the Display Carousel's setup code which enables the Display Carousel to operate at other locations such as blogs and webpages. See Exhibits J, L, M, N, and O "Advertisers" which shows current advertisers on the user's Display Carousel. See Exhibits J and P; "Settings" which permits the user to set certain features such as the title of the Display Carousel and logo used therewith. See Exhibits J and Q; "Statistics" which provides the user with certain statistical data such as number of views of the Display Carousel which have been made by others. See Exhibits J and R; and "Log Out" which logs the user out of the system. See Exhibits J and S.

In addition, the "Home" button will take the user back to the Home Page. See Exhibit J. The Home Page may include, for example, a dynamic image of the user's personal rotating Display Carousel which shows the Display Carousel and images and other content which is currently loaded on the Display Carousel.

The user may upload or remove images, text, hyperlinks, audio, video and other data and/or files to the windows of the Display Carousel at the "Upload Pictures" page. See Exhibit K.

The user may install a display carousel on any remote location including but not limited to blogs and webpages at the "Setup Code" page. See Exhibits L, M, N, and O. For example, the user may install the Display Carousel on websites (See Exhibit M), on MySpace (See Exhibit N) or FaceBook (See Exhibit O).

The user may monitor those who are using the users Display Carousel for advertising purposes at the "Advertisers" page. See Exhibit P. In addition, the user may also set the price to be charged to advertisers for displaying advertising on the users Display Carousel.

The user may control the settings related to the Display Carousel at the "Settings" page. See Exhibit Q. Such settings may include setting the title of the carousel, inserting a logo, or other select functions.

The user may monitor certain statistical data at the "Statistics" page. See Exhibit R. For example, the user may observe the number of views made to the Display Carousel on a daily basis.

Finally, the user may logout of the Display Carousel system by clicking on the "Log Out" button which brings the user to a login screen. See Exhibit S.

The embodiment of the invention depicted in Exhibits I through S may be included on any webpage on the internet. The Display Carousel may be sent as an attachment to an email such that it would also be able to be viewed by the recipient. When the user updates the content placed on the windows of the Display Carousel, the windows on all corresponding copies of the Display Carousel will also be updated automatically. In addition, the price for advertising on the Display Carousel may also be changed to charge advertisers who wish to advertise on the Display Carousel. The pricing will be updated instantaneously however, the aggregate price charged to advertisers who have already engaged who have already agreed upon other pricing. Moreover, advertisers are provided with a URL link which enables them to upload to the Display Carousel content of their choice. See, for example, http:/hylitradio.com/productlogo/demo/hylit.html, which is incorporated herein by reference.

In yet another embodiment of the instant invention the Display Carousel system comprises the following features:
1) Display System
A Special Effects (e.g. magnification/.gif/animation)
   1) Navigation/Customer URL Navigation
   2) All pictures have URL Navigation
   3) All customers have URL Navigation
B User Access/Customer Administration
   1) Customer account identity customization
   2) Administration Systems/Subscribers
A) Account customization
B) subscriber/commerce gateway pricing
C) Statistic values/subscriber
   3) Administration System/Corporate
   4) Commerce Gateways
A) Subscriber's Customers
Account Systems/Purchase gateway (see credit card administration)
   1) Subscriber's product uploads
   2) Geographic selections (to be added)
   3) Statistical Data/Customer
   5) Global Network/Customer (Agencies)
A) Customer
B) Account Administration
C) Product Uploads
D) Geographical Navigation
E) Statistics
   6) Information Systems (like a set of binoculars looking through the internet)
A) Credit Card Gateway
   1) Automatic Data Processing & Revenue Disbursement
   2) Customer Renewal notification
B) Local
   1) Subscriber Notification/Approval
C) Statistical Data out
D) Content Data in (automatic or manual)
E) Historical Data (in/out) (today, yesterday, tomorrow)
   1) Global Search Information
      a) Global search will go out and search the news e.g. Brittany Spears
F) People, Places and Things—delivered every 10 frames example
G) Current News/Local/National/International
H) Instant updated news Market reports and information data
I) Data Mining
   1) Statistical Data (get printouts)
   2) Sale of Data
   7) System Applications/Feature Applications
A) Automatic Screen Saver Interface
B) Coupon Carousel (online but not yet active)
C) Video
D) To be announced
   1) Emergency action notification system
   2) Local/current content (real time delivery) Would deliver real time current information
E) Search Engine Interface (e.g. HY LIT GLOBAL SEARCH found at www.hylitglobalsearch.com incorporated in its entirety herein by reference)

The disclosure herein is directed to certain features of the elements and methods of the invention disclosed as well as others that will be apparent to those skilled in the art in light of the disclosure herein. Thus, it is intended that the present invention covers all such modifications and variations of this invention and the equivalents thereof.

What is claimed is:

1. A system for displaying content in real time, said system comprising: a display carousel integrated into a website or webpage accessible over the Internet and comprising embedded hypertext, said display carousel comprising: one or more display windows configured to display said content dynamically delivered to said display windows by a display engine in communication with a server of said system or by an upload gateway on said website or webpage, and a processor coupled to a memory, said processor processes said content stored in said system for said display engine; a client portal or said one or more third party remote portals that displays said display carousel with said website or webpage, wherein said content is instantly passed between said display engine and said display carousel and displayed on said display carousel with said client portal or one or more third party remote portals, wherein said display windows of said display carousel are configured to revolve at a predetermined rate of speed when said website or webpage is displayed on said client portal or one or more third party remote portals.

2. The system of claim 1 wherein each of said one or more display windows each comprises its own individual content.

3. The system of claim 2 wherein said individual content comprises a link to an advertiser website or webpage.

4. The system of claim 1, wherein said display carousel may be displayed in an e-mail, a blog, a media player or other computerized device.

5. The system of claim 1, wherein said client portal is a web browser.

6. The system of claim 1, wherein said system server further comprises a database in communication with an image processing engine and said display engine.

7. The system of claim 1, wherein said content appearing in said one or more display windows has the appearance of being three-dimensional.

8. The system of claim 1, wherein said content comprises one or more of a photograph, a graphic, an image, audio content, video content, textual content, or a hyperlink to a website.

9. The system of claim 1, wherein said content displayed on said display carousel may be controlled through one more of said client portal and said one or more third party remote portals.

10. The system of claim 1, wherein at least a portion of said content on said display carousels may be changed on each third party remote portal at substantially the same time through said client portal.

11. The system of claim 1, wherein said content may be inputted into said system through said client portal and/or said one or more third party remote portals.

12. The system of claim 1, wherein said one or more third party remote portals are web browsers.

13. The system of claim 1 wherein said display windows of said display carousel revolve continuously.

14. The system of claim 1 wherein said display windows pause intermittently for a predetermined time while revolving.

15. The system of claim 1, wherein said one or more third party remote portals is a web browser.

16. A system for displaying content, said system comprising:
   a display carousel embedded into a website or webpage, said display carousel comprising
      one or more display windows configured to display said content and to revolve at a predetermined rate of speed when said display carousel is displayed with said website or webpage on said web browser, a display engine configured to deliver said content to said display windows of said display carousel when said website or webpage is displayed on a web browser, wherein said display engine is in communication with said website or webpage and a server of said system, and a database comprising storage and retrieval functionality for statistical and financial information about said content displayed on said display carousel, wherein said database is in communication with said server, wherein said content is instantly passed between said display engine and said display carousel when said display carousel is displayed with said website or webpage on said web browser.

17. The system of claim 16, wherein access to said one or more display windows of said display carousel may be purchased to display content.

18. The system of claim 17, wherein said display of said content may be limited by one or more of time, amount, and type.

19. A method for displaying content in real time on a computerized system comprising the steps of:

integrating a display carousel into a website or webpage comprising embedded hypertext, said display carousel comprising:

one or more display windows configured to display said content delivered to said one or more display windows by a display engine in communication with a server of said computerized system or by an upload gateway on said website or webpage, providing access to said website or webpage over the Internet, and dynamically delivering said content to said one or more display windows of said display carousel when said website or webpage is displayed on a web browser, wherein said one or more display windows revolve at a predetermined rate of speed when said display carousel is displayed with said website or web page on said web browser.

20. The method of claim 19, wherein at least a portion of said content displayed on said one or more display windows may be provided through said web browser.

* * * * *